(12) United States Patent
Magari et al.

(10) Patent No.: US 6,728,025 B2
(45) Date of Patent: Apr. 27, 2004

(54) SEMICONDUCTOR OPTICAL AMPLIFIER CHARACTERISTIC EVALUATION METHOD AND APPARATUS

(75) Inventors: Katsuaki Magari, Kanagawa (JP); Toshio Ito, Kanagawa (JP); Hiromi Oohashi, Kanagawa (JP); Hiroyuki Kamioka, Musashino (JP); Yasuhiro Suzuki, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 15 days.

(21) Appl. No.: 10/263,233

(22) Filed: Oct. 2, 2002

(65) Prior Publication Data

US 2003/0099033 A1 May 29, 2003

(30) Foreign Application Priority Data

Oct. 5, 2001 (JP) .......................... 2001-310426
Sep. 13, 2002 (JP) .......................... 2002-268796

(51) Int. Cl.[7] .............................. H01S 3/00; G01N 21/00
(52) U.S. Cl. ........................................ 359/333; 356/73.1
(58) Field of Search ................... 356/72, 73.1; 359/344, 359/333

(56) References Cited

U.S. PATENT DOCUMENTS

| 5,917,649 A | * | 6/1999 | Mori et al. .................. 359/341 |
| 6,480,318 B2 | * | 11/2002 | Mori et al. .................. 359/264 |
| 6,587,261 B1 | * | 7/2003 | Stephens et al. ............ 359/337 |

* cited by examiner

*Primary Examiner*—Mark Hellner
(74) *Attorney, Agent, or Firm*—Blakely, Sokoloff, Taylor & Zafman

(57) ABSTRACT

In an SOA characteristic evaluation method, the current is supplied to an SOA. An optical output generated by the SOA that have received the current is measured. Transmission light obtained by transmitting the optical output through a wavelength filter and/or a polarizer is measured. The characteristic of the SOA is evaluated on the basis of the measurement result of the optical output and the measurement result of the transmission light without using an optical input to the SOA. An SOA characteristic evaluation apparatus is also disclosed.

24 Claims, 10 Drawing Sheets

SEMICONDUCTOR OPTICAL AMPLIFIER CHARACTERISTIC EVALUATION METHOD AND APPARATUS

BACKGROUND OF THE INVENTION

The present invention relates to a semiconductor optical amplifier characteristic evaluation method and apparatus and, more particularly, to a characteristic evaluation method for a semiconductor optical amplifier (to be referred to as an SOA hereinafter) used in an optical transmission system for optical communication, optical switching, optical signal processing, or the like.

An optical transmission system using light for optical communication, optical switching, optical signal processing, or the like uses various kinds of optical devices. In such an optical transmission system, an optical loss poses a serious problem, and therefore, it is indispensable to compensate for an attenuated optical signal using optical amplifiers. Of optical amplifiers essential in an optical transmission system, an SOA is compact and highly efficient. A semiconductor optical amplifier is very promising because it can be hybrid-integrated with a planar lightwave circuit (PLC) constituted by a quartz-based optical waveguide.

To use SOAs in optical transmission systems, they must undergo chip evaluation to screen non-defective units before hybrid mounting or module mounting.

For such screening, an SOA characteristic evaluation apparatus as shown in FIG. 10 is conventionally used. FIG. 10 shows the schematic arrangement of the characteristic evaluation apparatus. As shown in FIG. 10, the conventional SOA characteristic evaluation apparatus comprises a multi-wavelength optical source 101 for emitting multi-wavelength light, a wavelength selection switch 105 for selecting a specific wavelength from the multi-wavelength light emitted from the multi-wavelength optical source 101, an optical attenuator 106 for adjusting the optical intensity, a polarization controller 102 for generating various polarized states, optical power meters 104 and 108 for monitoring output light (amplified spontaneous emission or ASE) from an SOA 115, an optical circulator 103, a coupler 107, a wavelength filter 109 for screening a wavelength, and an optical power meter 110 for measuring the optical intensity. These components are connected using optical fibers.

To evaluate the characteristic of the SOA using the apparatus shown in FIG. 10, first, optical fibers 113 and 114 are aligned to the two ends of the SOA 115 while monitoring, by the optical power meters 104 and 108, output light (amplified spontaneous emission or ASE) from the SOA 115 to be evaluated.

After the optical fibers 113 and 114 are aligned, the wavelength selection switch 105 selects a specific wavelength from multi-wavelength light emitted from the multi-wavelength optical source 101. The optical attenuator 106 adjusts the optical intensity. The polarization controller 102 controls the polarized state. The light is thus guided to an end face of the SOA 115 through the optical fiber 113. The external light is thus input to the SOA 115.

On the other hand, the optical power meter 110 measures the optical intensity of input/output light from the SOA 115, which is guided to the wavelength filter 109 through the optical fiber 114 and undergoes noise component removal by the wavelength filter 109.

In this state, the polarization controller 102 generates various polarized states. The absolute value of the gain of the SOA 115 can be calculated from the measurement value by the optical power meter 110 at this time. In addition, the dependence of the gain on polarization can be measured by measuring the maximum or minimum value of the optical intensity by the optical power meter 110.

For semiconductor lasers having a structure similar to an SOA, the elements are evaluated on the basis of the current vs. optical output characteristic (I-L characteristic) by pulse driving in order to remove the influence of heat.

For the SOA 115, however, since light is input to it through the optical fiber 113, the amplified optical intensity of the external injection light decreases due to the fiber coupling loss at the two ends of the SOA 115. To ensure a sufficient measurement sensitivity in the above-described evaluation of the SOA 115, CW current driving is executed.

However, for CW current driving of the chip of the SOA 115, the chip of the SOA 115 must be mounted on a heat sink that is excellent in heat dissipation. Since the evaluation chip must be bonded, it cannot be mounted in a product.

In addition, to evaluate the characteristic of the SOA 115, its two ends must accurately be coupled to fibers. To do this, a fine optical fiber alignment is needed at the two ends of the SOA 115. Furthermore, precise alignment on the submicron order is necessary. Measuring the gain by the procedure for both end facets of the SOA takes a lot of time.

Hence, in the above-described conventional evaluation method, chip evaluation is executed by sampling inspection. The characteristics of chips to be used for products are unknown.

Additionally, the SOA 115 has a broad gain bandwidth. Hence, to accurately evaluate the characteristic of the SOA 115, the dependence of the gain on wavelength must be measured.

The SOA 115 must also be evaluated to check how much the gain characteristic changes depending on the polarized state of incident light (the dependence of the gain on polarization). The number of evaluation items is larger than that of a semiconductor laser, and therefore, the inspection is time-consuming.

SUMMARY OF THE INVENTION

The present invention has been made to solve the above problems, and has as its object to make it possible to continuously and accurately evaluate the characteristics of all manufactured semiconductor optical amplifiers (chips) in a short time with an arrangement more inexpensive and simpler than before by, e.g., executing characteristic evaluation such as characteristic screening of elements to be used for products without using any fiber coupling.

In order to achieve the above object, according to the present invention, there is provided a semiconductor optical amplifier characteristic evaluation method comprising supplying the current to a semiconductor optical amplifier, measuring an optical output generated by the semiconductor optical amplifier that has received the current, measuring transmission light obtained by transmitting the optical output through optical transmission adjustment means, and evaluating a characteristic of the semiconductor optical amplifier on the basis of a measurement result of the optical output and a measurement result of the transmission light without using an optical input to the semiconductor optical amplifier.

DESCRIPTION OF THE PREFERRED EMBODIMENTS

The embodiments of the present invention will be described below with reference to the accompanying drawings.

First Embodiment

Figure 1A:
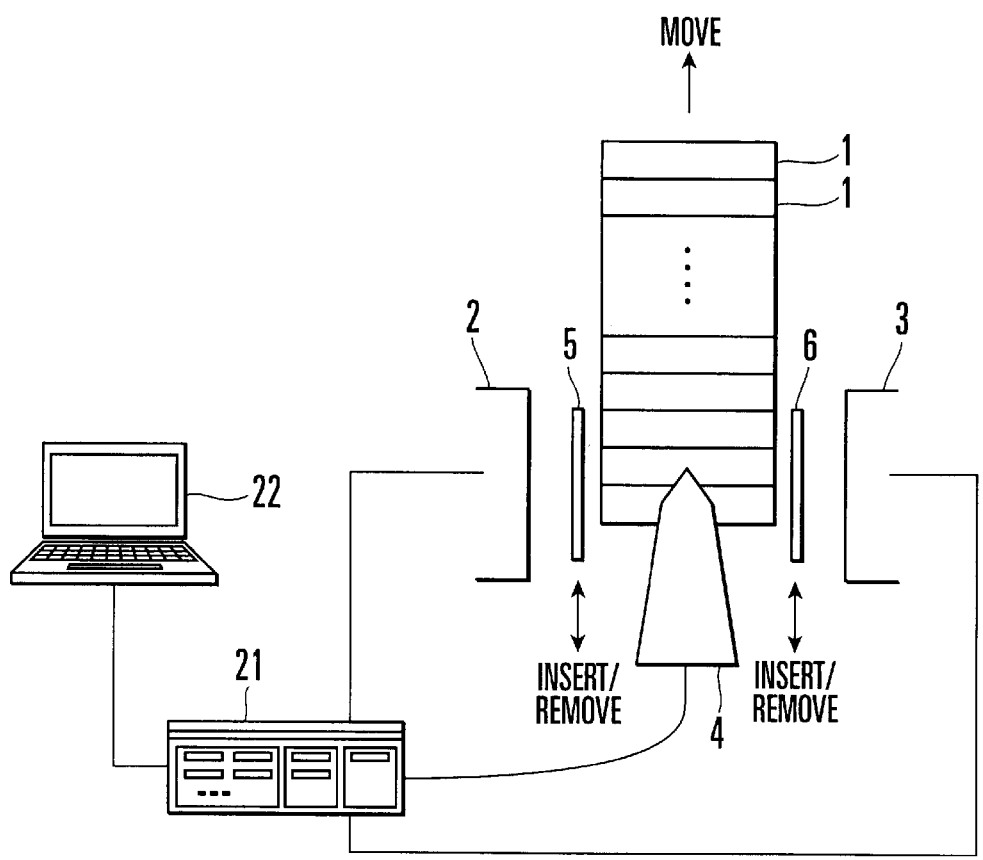
FIG. 1A is a plan view showing the schematic arrangement of an SOA characteristic evaluation apparatus according to the first embodiment of the present invention.
Figure 1B:
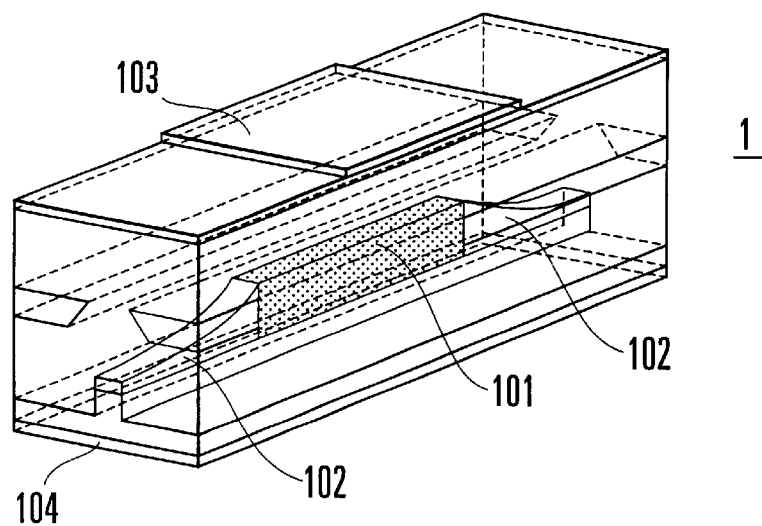
FIG. 1B is a perspective view showing the arrangement of an SOA.
Figure 2A:
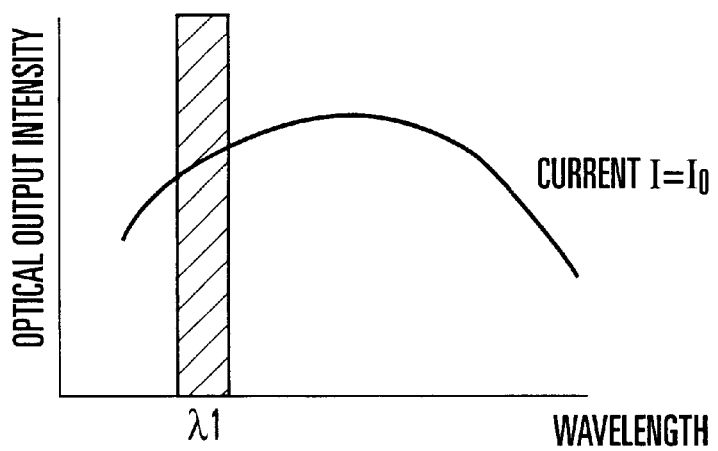
FIG. 2A is a graph showing the ASE spectrum of the SOA.
Figure 2B:
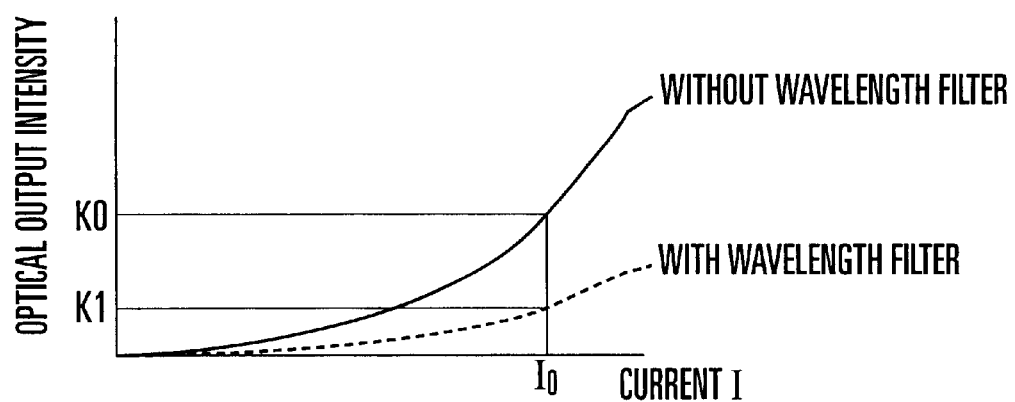
FIG. 2B is a graph showing the I-L (ASE intensity) characteristic of the SOA depending on the presence/absence of a wavelength filter.

FIG. 1A shows the schematic arrangement of a semiconductor optical amplifier characteristic evaluation apparatus according to the first embodiment of the present invention. FIG. 1B shows an example of an SOA to be evaluated. FIG. 2A shows the ASE spectrum of the SOA. FIG. 2B shows the I-L (ASE intensity) characteristic of the SOA depending on the presence/absence of a wavelength filter.

In this characteristic evaluation apparatus, optical receivers (optical receiving means) 2 and 3 are arranged at the both ends of an SOA 1 having a rectangular parallelepiped shape long in the waveguide direction. The characteristic evaluation apparatus includes a needle-like probe 4 which can supply the current to the electrode of each of SOAs 1 connected in the shape of a bar. Note that the plurality of SOAs 1 connected in the shape of a bar will be referred to as "bar-shaped SOAs 1" hereinafter. The bar-shaped SOAs 1 can be formed by cutting them from a wafer such that the plurality of SOAs 1 are continuous in a line in a direction perpendicular to the light incidence end faces. Wavelength filters 5 and 6 serving as optical transmission adjustment means are arranged between the optical receivers 2 and 3 and the both end of each of the bar-shaped SOAs 1 so as to be freely inserted or removed. The characteristic evaluation apparatus also has a power supply/ammeter 21 which supplies the current to the SOA 1 and indicates the output value from the optical receivers 2 and 3, and a computer 22 which executes various kinds of information processing in measured data by the power supply/ammeter 21. The computer 22 is an apparatus which executes wavelength characteristic discrimination, polarization characteristic discrimination, wavelength characteristic estimation, and the like (to be described below) in accordance with a program recorded in advance.

The SOA characteristic evaluation apparatus according to this embodiment will be described below.

One of the SOAs 1 has spot size conversion regions 102 at the input and output ends of an active region 101 that executes optical amplification, as shown in, e.g., the perspective view of FIG. 1B. The current supplied to electrodes 103 and 104 is supplied to the active region 101 whereby an optical signal passing through the active region 101 is amplified. The SOA 1 is fixed to a stage (fixing means) (not shown) movable in a predetermined position. This stage is moved in the predetermined position, and the probe is sequentially brought into contact with each of the arrayed SOAs by a probe movement control means (not shown) to supply the current.

To execute characteristic screening (characteristic evaluation) of the SOAs 1, the probe 4 is brought into contact with one of the bar-shaped SOAs 1. The power supply/ammeter 21 supplies, through the probe 4, the current $I=I_0$ to the SOA 1 that is in contact with the probe 4. The wavelength filters 5 and 6 are kept removed. In this state, when the current $I=I_0$ is supplied, the optical outputs from the SOA 1 are detected by the optical receivers 2 and 3. The outputs from the optical receivers 2 and 3, which are obtained through the power supply/ammeter 21, are loaded and processed by the computer 22. In this way, the optical output intensity from the SOA 1 is measured.

Next, the wavelength filters 5 and 6 are kept inserted. In this state, when the current $I=I_0$ is supplied, the optical outputs from the SOA 1 are detected by the optical receivers 2 and 3. The outputs from the optical receivers 2 and 3, which are obtained through the power supply/ammeter 21, are read by the computer 22. In this way, the optical output intensity from the SOA 1 is measured.

When the current $I=I_0$ is supplied, the optical output intensity from the SOA 1 has a broadband spectrum, as shown in FIG. 2A. For this reason, when the wavelength filters 5 and 6 are kept removed, an intensity obtained by integrating the entire wavelength band shown in FIG. 2A is obtained as the optical output intensity from the SOA 1.

On the other hand, when the wavelength filters 5 and 6 are kept inserted, only the wavelength band of a wavelength $\lambda 1$ indicated by the hatched portion in FIG. 2A is transmitted through the wavelength filters 5 and 6 and received by the optical receivers 2 and 3. For this reason, the received optical intensity at this time is lower than the optical output intensity from the SOA 1 when the wavelength filters 5 and 6 are kept removed.

In addition, the optical output intensities when the wavelength filters 5 and 6 are kept inserted and removed increase as the current increases. When the current $I=I_0$ is supplied, the optical output intensities are uniquely defined. For this reason, it can be discriminated whether the peak wavelength of the SOA 1 is appropriate by checking to which optical output intensity of the SOA 1 the received optical intensity corresponds (the ratio of two data shown in FIG. 2B) (wavelength characteristic discrimination).

For example, when the wavelength filters 5 and 6 are kept removed, and the current $I=I_0$ is supplied, the optical output intensity is defined as a specified value K0. When the wavelength filters 5 and 6 are kept inserted, and the current $I=I_0$ is supplied, the optical output intensity is defined as a specified value K1. When the wavelength filters 5 and 6 are kept removed, the received optical intensity is compared with the specified value K0 of a non-defective unit. In addition, the received optical intensity when the wavelength filters 5 and 6 are kept inserted is compared with the specified value K1 of a non-defective unit. With this processing, it can be determined whether not only the optical output intensity of the SOA 1 but also the optical output intensity in the wavelength range $\lambda 1$ having the spectrum shape shown in FIG. 2A is appropriate. Hence, the wavelength characteristics of the SOAs 1 can be screened. For example, the computer 22 operates on the basis of a predetermined program recorded in advance. The computer 22 thus executes the above-described received optical intensity comparison and screening.

When characteristic evaluation of one of the bar-shaped SOAs 1 is ended, the bar-shaped SOAs 1 are moved by a distance corresponding to one element while keeping the probe 4 lifted, and the same process as described above is executed.

According to the above-described first embodiment, the characteristic of the SOA 1 can be evaluated only by measuring received optical intensities while keeping the wavelength filters 5 and 6 inserted and removed. For this reason, according to this embodiment, no external light injection to the SOA 1 is needed. Accurate fiber coupling to the two ends of the SOA 1 is unnecessary. Hence, the fiber coupling loss and the like can be eliminated, and a sufficient measurement sensitivity can be obtained. As a result, the current can be supplied to the SOA 1 by pulse driving. Mounting on a mount excellent in heat dissipation is unnecessary. Hence, direct evaluation of elements to be mounted in products can be executed. In addition, there has been no need for fiber alignment, and the measurement time can be shortened.

Since the bar-shaped SOAs 1 are directly evaluated, the SOAs 1 in evaluating their characteristics can easily be handled. Even when all the SOAs 1 are inspected, any increase in measurement time can be suppressed.

In inspecting all the SOAs 1, the bar-shaped SOAs 1 may be moved by a distance corresponding to one element. Instead, the probe 4, optical receivers 2 and 3, and optical filters 5 and 6 may be moved by a distance corresponding to one element. These modifications are also applied to all the following embodiments. In the above-described embodiment, the power supply and ammeter are integrated. However, they may be separated. This modification is also applied to all the following embodiments.

Second Embodiment

Figure 3A:
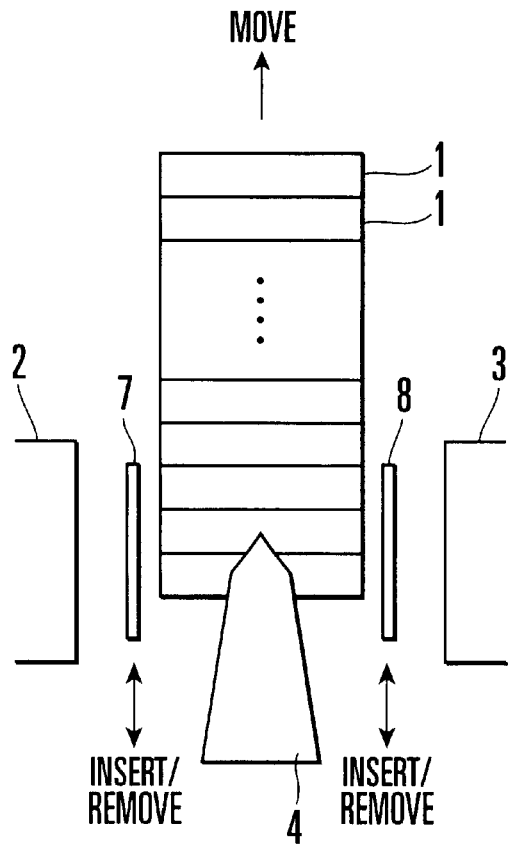
FIG. 3A is a plan view showing the schematic arrangement of an SOA characteristic evaluation apparatus according to the second embodiment of the present invention.
Figure 3B:
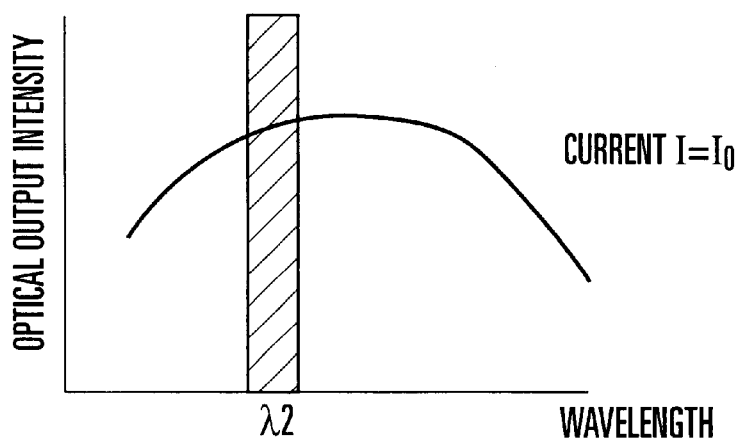
FIG. 3B is a graph showing the ASE spectrum of an SOA.
Figure 4A:
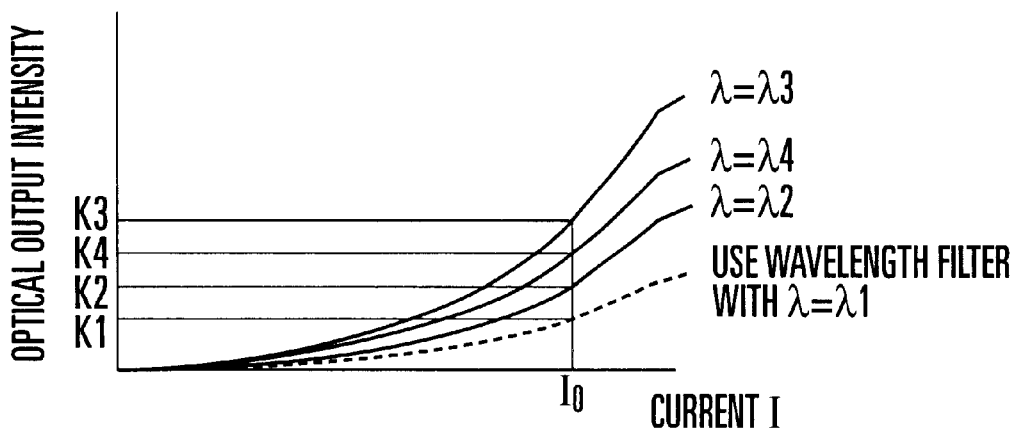
FIG. 4A is a graph showing the I-L (ASE intensity) characteristic of the SOA when the current is changed.
Figure 4B:
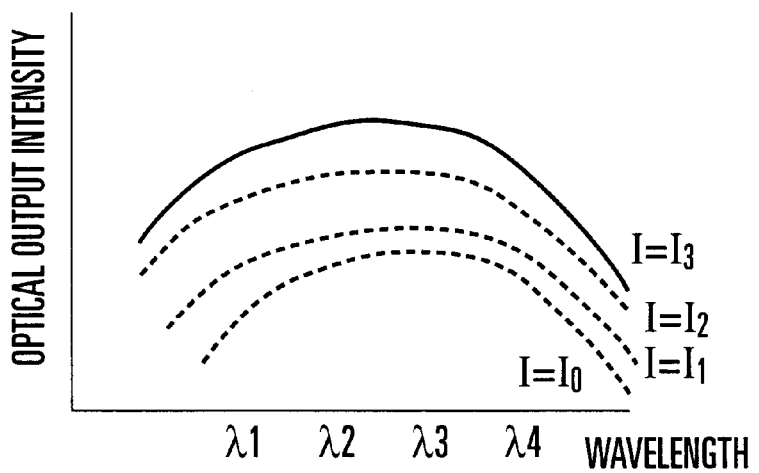
FIG. 4B is a graph showing the ASE spectrum of the SOA when the transmission wavelength of the wavelength filter is changed.

FIG. 3A shows the schematic arrangement of an SOA characteristic evaluation apparatus according to the second embodiment of the present invention. FIG. 3B shows the ASE spectrum of an SOA. FIG. 4A shows the I-L (ASE intensity) characteristic of the SOA when the current is changed. FIG. 4B shows the ASE spectrum of the SOA when the transmission wavelength of the wavelength filter is changed.

Referring to FIG. 3A, in this characteristic evaluation apparatus, wavelength filters 7 and 8 are arranged in place of wavelength filters 5 and 6 shown in FIG. 1A as optical transmission adjustment means. The transmission range of the wavelength filters 5 and 6 shown in FIG. 1A is $\lambda 1$ while that of the wavelength filters 7 and 8 shown in FIG. 3A is changed to $\lambda 2$. When different wavelength filters are used, characteristic screening (evaluation) can be executed by changing the center wavelength of the wavelength band to be transmitted.

To execute characteristic evaluation of SOAs 1 using the above arrangement shown in FIG. 3A, a probe 4 is brought into contact with one element of the bar-shaped SOAs 1. The current $I=I_0$ is supplied to the SOA 1 through the probe 4.

Wavelength filters 5 and 6 are kept inserted. In this state, when the current $I=I_0$ is supplied, the optical outputs from the SOA 1 are detected by optical receivers 2 and 3. In this way, the optical output intensity from the SOA 1 is measured.

Next, the wavelength filters 7 and 8 are kept inserted in place of the wavelength filters 5 and 6. When the current $I=I_0$ is supplied, the optical outputs from the SOA 1 are detected by the optical receivers 2 and 3. In this way, the optical output intensity from the SOA 1 is measured.

When the current $I=I_0$ is supplied, the optical output intensity from the SOA 1 has a broadband spectrum, as shown in FIG. 3B. When the wavelength filters 7 and 8 are kept inserted, only the wavelength band of the wavelength $\lambda 2$ indicated by the hatched portion in FIG. 3B is transmitted through the wavelength filters 7 and 8 and received by the optical receivers 2 and 3.

As shown in FIG. 4A, the optical output intensity when the wavelength filters 7 and 8 having a different transmission band are used changes for each transmission band of the wavelength filters 7 and 8. When the wavelength filters 5 and 6 are used, and the current $I=I_0$ is supplied, the optical output intensity can be defined as a specified value K1. When the wavelength filters 7 and 8 are used, and the current $I=I_0$ is supplied, the optical output intensity can be defined as a specified value K2.

The received optical intensity when the wavelength filters 5 and 6 are kept inserted is compared with the specified value K1. In addition, the received optical intensity when the wavelength filters 7 and 8 are kept inserted is compared with the specified value K2. Furthermore, measurement results that are obtained using the wavelength filters 7 and 8 by changing the transmission wavelength to $\lambda 3$ and $\lambda 4$ are compared with specified values K3 and K4. With this processing, it can be determined not only whether the optical output intensity in the wavelength range $\lambda 1$ is appropriate but also whether the optical output intensity in the wavelength range $\lambda 2$ is appropriate. Hence, the accuracy of characteristic evaluation of the SOA 1 can be increased.

Furthermore, when wavelength filters having transmission bands in transmission bands $\lambda 3$ and $\lambda 4$ are used, the number of optical output intensity measurement points in specific wavelength ranges can be increased.

When current values $I_0$, $I_1$, $I_2$, and $I_3$ are selected from the data shown in FIG. 4A, and data are extracted for each of the current values $I_0$, $I_1$, $I_2$, and $I_3$ in correspondence with each of the wavelengths λ1, λ2, λ3, and λ4, the dependence of the spectrum on current shown in FIG. 4B can be reproduced. Accordingly, since the spectrum values of a plurality of optical output intensities can be compared with specified values, the accuracy of characteristic evaluation of the SOA 1 can be further increased.

When characteristic evaluation of one of the bar-shaped SOAs 1 is ended, the bar-shaped SOAs 1 are moved by a distance corresponding to one element while keeping the probe 4 lifted, and the same process as described above is executed.

Third Embodiment

Figure 5A:
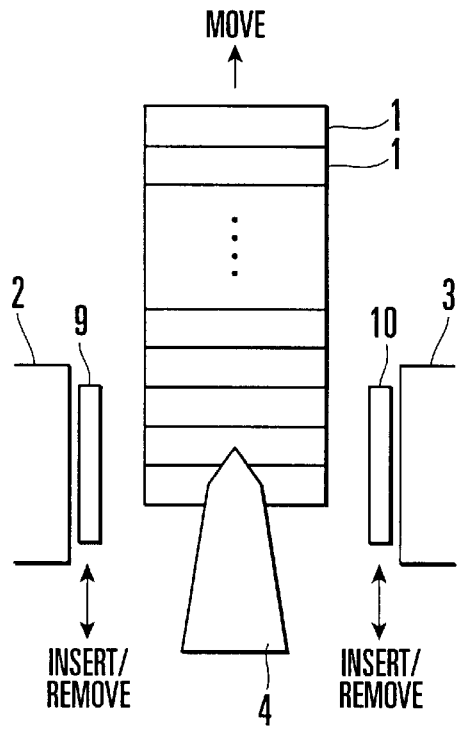
FIG. 5A is a plan view showing the schematic arrangement of an SOA characteristic evaluation apparatus according to the third embodiment of the present invention.
Figure 5B:
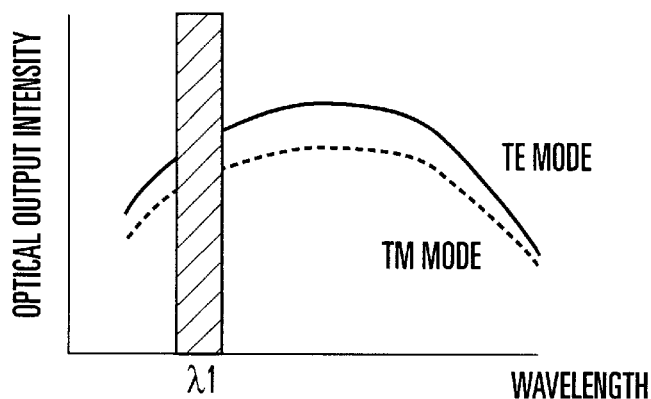
FIG. 5B is a graph showing the ASE spectrum of an SOA polarized and separated by a polarizer.
Figure 5C:
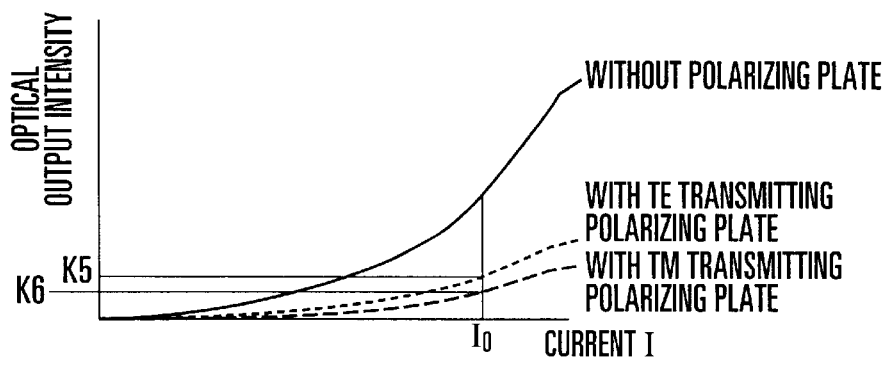
FIG. 5C is a graph showing the I-L (ASE intensity) characteristic of the SOA polarized and separated by a polarizer.

FIG. 5A shows the schematic arrangement of an SOA characteristic evaluation apparatus according to the third embodiment of the present invention. FIG. 5B is a graph showing the ASE spectrum of an SOA polarized and separated by a polarizer. FIG. 5C shows the I-L (ASE intensity) characteristic of the SOA polarized and separated by a polarizer.

Referring to FIG. 5A, in this characteristic evaluation apparatus, polarizers 9 and 10 are arranged in place of the wavelength filters 5 and 6 shown in FIG. 1A as optical transmission adjustment means.

To execute characteristic screening of SOAs 1 using the arrangement shown in FIG. 5A, a probe 4 is brought into contact with one element of the bar-shaped SOAs 1. The current $I=I_0$ is supplied to the SOA 1 through the probe 4.

The polarizers 9 and 10 are kept inserted. When the current $I=I_0$ is supplied, the optical outputs from the SOA 1 are detected by optical receivers 2 and 3. In this way, the optical output intensity from the SOA 1 is measured. The optical output intensity measurement is executed only twice using the polarizers 9 and 10, i.e., by using a TE mode transmission plate first, and then a TM mode transmission plate.

The optical output intensities of TE mode transmission light and TM mode transmission light of the SOA 1 have broadband spectra, as shown in FIG. 5B. The received optical intensities when the polarizers 9 and 10 are used decrease to almost ½ that when the polarizers 9 and 10 are not used, as shown in FIG. 5C. The optical output intensities of TE mode transmission light and TM mode transmission light may differ between the modes. The intensity difference between the TE mode transmission light and the TM mode transmission light reflects the spectrum difference shown in FIG. 5B. When the TE mode transmission plate is used, and the current $I=I_0$ is supplied, the optical output intensity can be defined as a specified value K5. When the TM mode transmission plate is used, and the current $I=I_0$ is supplied, the optical output intensity can be defined as a specified value K6.

Two polarized optical components whose polarization states are perpendicular to each other are measured. In addition to comparison between the specified value K5 and the measured value of the received optical intensity when the TE mode transmission plate is inserted and comparison between the specified value K6 and the measured value of the received optical intensity when the TM mode transmission plate is inserted, for example, the difference (measurement value difference) between the TE mode measurement value and the TM mode measurement value and the difference (specified value difference) between the specified value K5 and the specified value K6 are executed. When the measurement value difference is compared with the specified value difference, the dependence on polarization can also be measured as a characteristic of the SOA. When the dependence on polarization can be evaluated, the accuracy of characteristic screening of SOAs 1 can be further increased.

The amplification gain by the SOA 1 is preferable to be polarization independent. However, when the fabrication accuracy and the like of the SOA 1 are taken into consideration, the dependence on polarization remains. When the received optical intensity measurement process while keeping the polarizers 9 and 10 inserted and removed is added, and the dependence of the SOA 1 on polarization is obtained, the accuracy of characteristic screening of SOAs 1 can be increased without complicating the characteristic screening process.

When characteristic evaluation of one of the bar-shaped SOAs 1 is ended, the bar-shaped SOAs 1 are moved by a distance corresponding to one element while keeping the probe 4 lifted, and the same process as described above is executed.

Fourth Embodiment

Figure 6A:
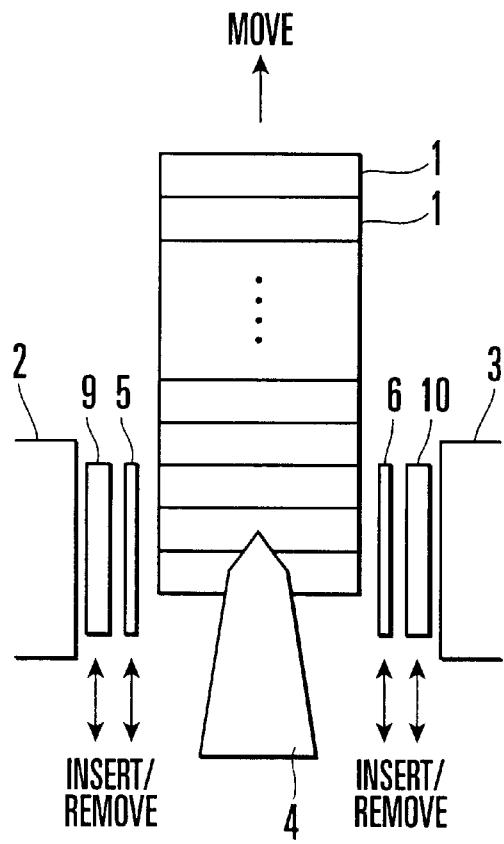
FIG. 6A is a plan view showing the schematic arrangement of an SOA characteristic evaluation apparatus according to the fourth embodiment of the present invention.
Figure 6B:
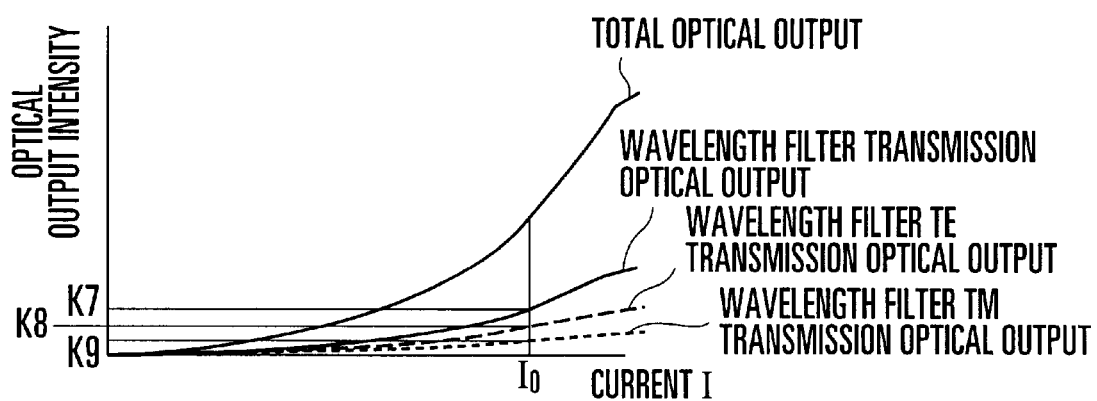
FIG. 6B is a graph showing the I-L (ASE intensity) characteristic of an SOA whose output is transmitted through a wavelength filter, the I-L characteristic of an SOA whose output is polarized and separated by a polarizer, and the I-L characteristic of an SOA whose output is transmitted through a wavelength filter and polarized and separated by a polarizer.

FIG. 6A shows the schematic arrangement of an SOA characteristic evaluation apparatus according to the fourth embodiment of the present invention. FIG. 6B shows the I-L (ASE intensity) characteristic of an SOA transmitted through a wavelength filter and polarized and separated by a polarizer.

Referring to FIG. 6A, in this characteristic evaluation apparatus, polarizers 9 and 10 are arranged in addition to wavelength filters 5 and 6 shown in FIG. 1A. In stead of the wavelength filters 5 and 6 shown in FIG. 1A, wavelength filters 7 and 8 shown in FIG. 3A may be used.

To execute characteristic screening of SOAs 1, a probe 4 is brought into contact with one of the bar-shaped SOAs 1. The current $I=I_0$ is supplied to the SOA 1 through the probe 4.

The wavelength filters 5 and 6 are kept inserted. When the current $I=I_0$ is supplied, the optical outputs from the SOA 1 are detected by optical receivers 2 and 3. In this way, the optical output intensity from the SOA 1 is measured.

Next, while keeping the wavelength filters 5 and 6 inserted, a TE mode transmission plate is further inserted. When the current $I=I_0$ is supplied, the optical outputs from the SOA 1 are detected by optical receivers 2 and 3. In this way, the optical output intensity from the SOA 1 is measured.

Then, while keeping the wavelength filters 5 and 6 inserted, a TM mode transmission plate is inserted in place of the TE mode transmission plate. When the current $I=I_0$ is supplied, the optical outputs from the SOA 1 are detected by optical receivers 2 and 3. In this way, the optical output intensity from the SOA 1 is measured.

The optical output intensities of TE mode transmission light and TM mode transmission light of the SOA 1 have broadband spectra, as shown in FIG. 5B. When the wavelength filters 5 and 6 are kept inserted, only the wavelength band of a wavelength λ1 indicated by the hatched portion in FIG. 5B is transmitted through the wavelength filters 5 and 6 and received by the optical receivers 2 and 3.

As shown in FIG. 6B, the optical output intensities of TE mode transmission light and TM mode transmission light change for each transmission band of the wavelength filters 5 and 6. When only the wavelength filters 5 and 6 are used, and the current $I=I_0$ is supplied, the optical output intensity can be defined as a specified value K7. When the wavelength filters 5 and 6 and TE mode transmission plate are used, and the current $I=I_0$ is supplied, the optical output intensity can be defined as a specified value K8. When the wavelength filters 5 and 6 and TM mode transmission plate are used, and the current $I=I_0$ is supplied, the optical output intensity can be defined as a specified value K9.

When the received optical intensity when only the wavelength filters 5 and 6 are inserted is compared with the specified value K7, the received optical intensity when the wavelength filters 5 and 6 and TE mode transmission plate are inserted is compared with the specified value K8, and the received optical intensity when the wavelength filters 5 and 6 and TM mode transmission plate are inserted is compared with the specified value K9, it can be determined whether not only the gain characteristic of the SOA 1 but also the dependence on polarization is appropriate. The accuracy of characteristic screening of the SOAs 1 can be increased only by adding the process of inserting or removing the wavelength filters 5 and 6 and polarizers 9 and 10.

When characteristic evaluation of one of the bar-shaped SOAs 1 is ended, the bar-shaped SOAs 1 are moved by a distance corresponding to one element while keeping the probe 4 lifted, and the same process as described above is executed.

According to the above-described embodiment, the dependence of the SOA 1 on wavelength or polarization can be measured at once by inserting or removing combinations of the wavelength filters 5 and 6 and polarizers 9 and 10. This characteristic evaluation apparatus can easily cope with a number of measurement evaluation items.

Fifth Embodiment

Figure 7:
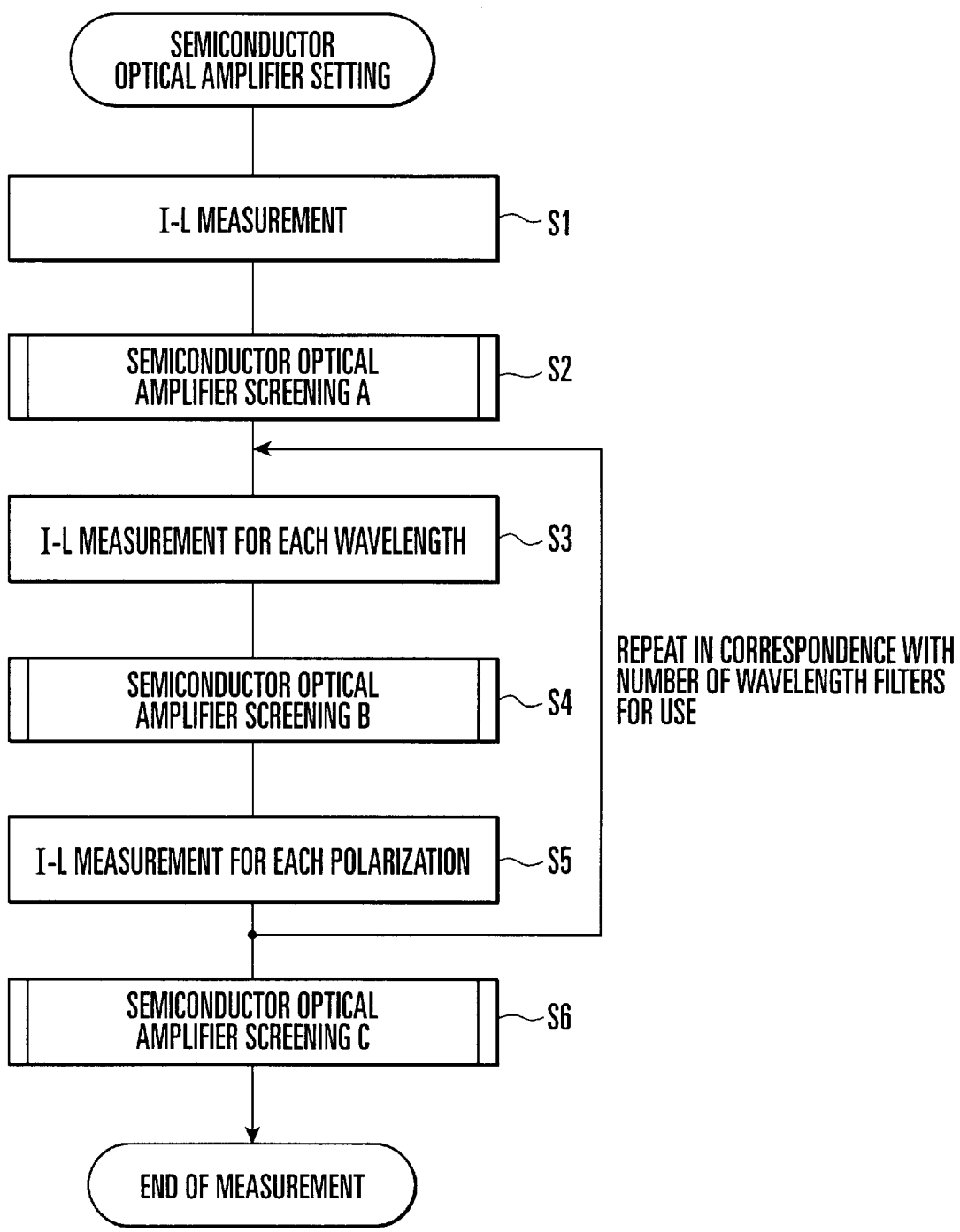
FIG. 7 is a flow chart showing an SOA characteristic evaluation method according to an embodiment of the present invention.

FIG. 7 shows an SOA characteristic evaluation method according to the fifth embodiment of the present invention.

In the characteristic evaluation method of this embodiment, first, SOAs 1 are set in a characteristic evaluation apparatus, and I-L measurement of the SOA 1 is executed without using any wavelength filter (step S1). Next, when a specific current is supplied, the optical output intensity from the SOA 1 is compared with a specified value. Element screening A is thus executed (step S2). Then, wavelength filters 5 and 6 are inserted between the end faces of the SOA 1 and optical receiver 2 and between the end faces of the SOA 1 and optical receiver 3, respectively. Subsequently, I-L measurement of the SOAs 1 is executed (step S3).

The optical output intensity from the SOA 1 when the wavelength filters 5 and 6 are inserted is compared with each specified value. Element screening B is thus executed (step S4).

In addition to the wavelength filters, polarizers 9 and 10 are inserted between the end faces of the SOA 1 and optical receiver 2 and between the end faces of the SOA 1 and optical receiver 3, respectively. Subsequently, I-L measurement of the SOA 1 is executed (step S5). The I-L measurement of the SOA 1 in step S5 is executed only twice using a TE mode transmission plate and TM mode transmission plate as the polarizers 9 and 10.

After the polarizers 9 and 10 are removed, the flow returns to step S3. The wavelength filters 5 and 6 are exchanged (for example, the wavelength filters 5 and 6 are exchanged with wavelength filters 7 and 8 having a different transmission wavelength range), and measurement is executed. The measurement is repeated while appropriately exchanging the wavelength filters with those prepared for use (steps S3 to S5).

Finally, the optical output intensity from the SOA 1 when the polarizers 9 and 10 are inserted is compared with each specified value, including optical output intensities in the repeated cycles. Element screening C is thus executed (step S6). For example, steps S1 and S2 may be executed after steps S3 to S5 are repeated. The order of processes is not limited to that shown in FIG. 7. In the above description, evaluation is executed in all steps. However, the steps may appropriately be selected. For example, measurement in step S3 and step S4 may be omitted. After only exchange of wavelength filters is executed in step S3, other steps may be executed for evaluation.

In this way, when characteristic screening of the SOA is executed, as shown in FIG. 7, not only sampling inspection but also direct evaluation of the elements to be mounted in products can be executed. In addition, since accurate fiber coupling to the two ends and external injection light are unnecessary, the measurement apparatus is simplified. Furthermore, not only the wavelength characteristic of the gain but also the dependence of the gain on polarization can be evaluated only by inserting or removing optical components such as the wavelength filters 5 to 8 or polarizers 9 and 10. Hence, the apparatus can easily cope with an increase in number of measurement items while shortening the measurement time.

As a method of inserting/removing the wavelength filters 5 to 8 or polarizers 9 and 10, a method of controlling insertion and removal of these optical components by a robot arm, a method of arranging these optical components on a linear rail including space portions without any optical components and controlling to place necessary optical components immediately in front of the optical receivers 2 and 3, or a method of arranging these optical components on a ring-shaped rail including space portions without any optical components and controlling to place necessary optical components immediately in front of the optical receivers 2 and 3 can be used.

The rail to be used to arrange the components such as the wavelength filters 5 to 8 or polarizers 9 and 10 may be parallel or perpendicular to the horizontal plane.

In the above-described embodiment, the optical output intensity is measured at the two ends of the SOA 1. However, this measurement may be done only at one end of the SOA 1.

As the characteristic evaluation apparatus, the optical receiver 2 may be arranged only on one side of the SOA 1, and the optical output intensities at the two ends of the SOA 1 may be measured by reversing the SOA 1 in the horizontal direction.

The characteristic evaluation apparatus may be applied to the SOA 1 having a spot size conversion unit or the SOA 1 having no spot size conversion unit.

The characteristic evaluation apparatus may also be applied to evaluate the characteristic of an optical element other than the SOA 1, which includes a semiconductor optical emitting element having input and output ends.

Sixth Embodiment

The sixth embodiment of the present invention will be described next with reference to FIGS. 8A, 8B, and 9.

Figure 8A:
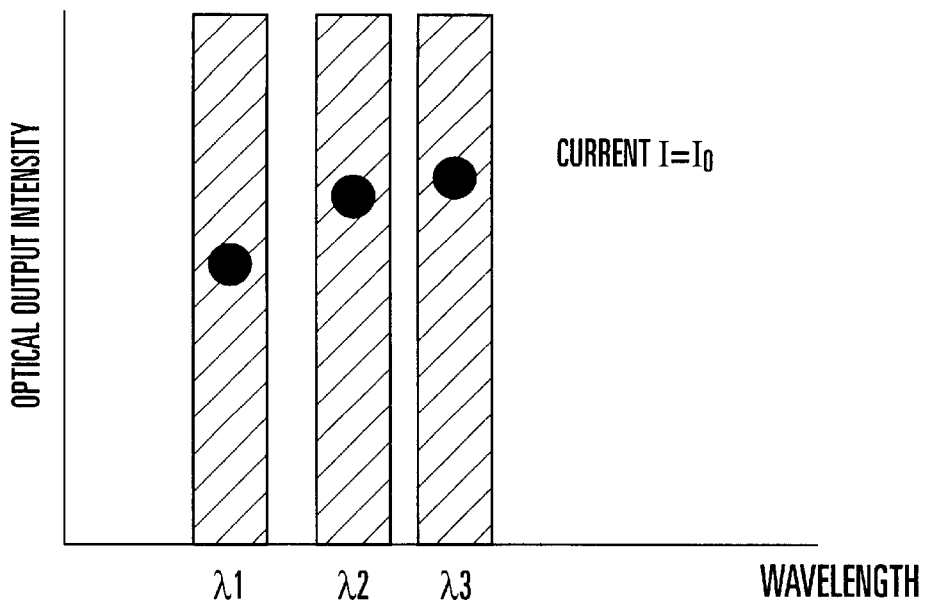
FIG. 8A is a conceptual view of a characteristic evaluation screening method according to the sixth embodiment of the present invention.
Figure 8B:
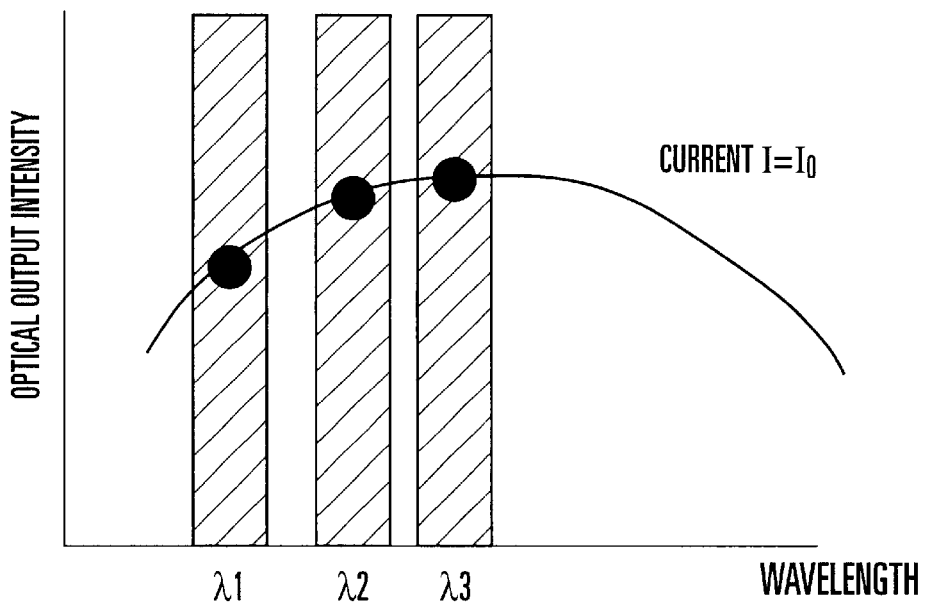
FIG. 8B is a conceptual view of the characteristic evaluation screening method according to the sixth embodiment of the present invention.

FIGS. 8A and 8B show a characteristic evaluation screening method according to the sixth embodiment of the present invention. FIG. 8A plots optical intensities measured using three wavelength filters. The transmission center wavelengths of the three wavelength filters are $\lambda 1$, $\lambda 2$, and $\lambda 3$, respectively. The transmission bands are indicated by hatched portions in FIG. 8A. FIG. 8B shows a result obtained by executing parameter fitting based on equation (8) to approximate the optical intensities. A result that satisfactorily coincides with the measurement result was obtained, and the effect of the measurement method according to this embodiment was confirmed.

A theoretical background for this will be described in detail.

An optical output intensity $P_{ASE}(\lambda)$ transmitted through a filter at a wavelength $\lambda$ is given by equation (1). Derivation of equation (1) is described in detail in known reference, N. A. Olsson, "IEEE J. Lightwave Technol.", vol. 8, pp. 1081–1082, 1989.

$$P_{ASE}(\lambda) = (G^{lin}(\lambda) - 1) \cdot n_{sp} \cdot E \cdot \Delta v \quad (1)$$

where $G^{lin}(\lambda)$ is the gain, $n_{sp}$ is the spontaneous emission coefficient, $E = h \cdot v$ is the photon energy (h: Planck constant, v: frequency), $\Delta v$ is the bandwidth to be considered. An optical output intensity $P^{filtering}_{ASE}(\lambda_0)$ passing through a filter, which is obtained by the measurement method according to this embodiment, corresponds to a value obtained by integrating equation (1) by a center wavelength $\lambda_0$ across a filter band $\Delta \lambda_f$. Note that E and $G^{lin}(\lambda)$ are functions of the frequency v (i.e., wavelength $\lambda$). Then, the optical output intensity $P^{filtering}_{ASE}(\lambda_0)$ is approximately given by $$P^{filtering}_{ASE}(\lambda_0) \cong hc^2 n_{sp} \cdot (G^{lin}(\lambda_0) - 1) \cdot \frac{\Delta \lambda_f}{\lambda_0^3} \quad (2)$$

where c is the optical speed given by $c = \lambda_0 v$.

In a range where the gain is sufficiently large, equation (3) below holds.

$$P^{filtering}_{ASE}(\lambda_0) \cong hc^2 n_{sp} \cdot G^{lin}(\lambda_0) \cdot \frac{\Delta \lambda_f}{\lambda_0^3} \quad (3)$$

The physical quantity represented by equation (4) can be defined as the virtual optical input. Then a gain $G^{lin}(\lambda_0)$ can be obtained using the optical output intensity passing through the filter $P^{filtering}_{ASE}(\lambda_0)$ and the virtual optical input.

$$P_{ASE-input}(\lambda_0) = hc^2 n_{sp} \cdot \frac{\Delta \lambda_f}{\lambda_0^3} \quad (4)$$

When equation (3) is expressed using dB, it can be rewritten to $$P^{dB-filtering}_{ASE}(\lambda_0) = \quad (5)$$
$$10\log(P^{filtering}_{ASE}(\lambda_0)) = 10\log\left(hc^2 n_{sp} \frac{\Delta \lambda_f}{\lambda_0^3}\right) + 10\log(G^{lin}(\lambda_0))$$

Using the definitions $$P^{dB}_{ASE-input}(\lambda_0) = 10\log\left(hc^2 n_{sp} \frac{\Delta \lambda_f}{\lambda_0^3}\right) \quad (6)$$

for $G^{dB}(\lambda_0) = 10 \cdot \log(G^{lin}(\lambda_0))$.

$$P^{dB-filtering}_{ASE}(\lambda_0) = G^{dB}(\lambda_0) + P^{dB}_{ASE-input}(\lambda_0) \quad (7)$$

In the above-described first to fifth embodiments, a value $P^{dB}_{ASE-input}(\lambda_0)$ is set on the basis of equation (6). Using one of a measured value $P^{dB-filtering}_{ASE}(\lambda_0)$ and a value $G^{dB}(\lambda_0)$ calculated from equation (7), it is possible to execute chip screening whether the value agree within the set data range. Screening is thus executed.

Equation (7) indicates that when the value $P^{dB-filtering}_{ASE}(\lambda_0)$ is obtained by measurement, and the value $P^{dB}_{ASE-input}(\lambda_0)$ as virtual input light is calculated on the basis of equation (6), the gain characteristic $G^{dB}(\lambda_0)$ can be obtained as the difference between the values. Hence, measuring the transmission optical output $P^{dB-filtering}_{ASE}(\lambda_0)$ of the wavelength filter is equivalent to measuring the gain characteristic. In the above-described first to fifth embodiments, the optical output is used in place of the gain as the characteristic of the SOA. However, when equation (7) is taken into consideration, it almost equivalent to measuring the gain characteristic. The value $P^{dB-filtering}_{ASE}(\lambda_0)$ is represented as the function of $\lambda_0$. In the normal optical transmission wavelength band, the dependence on $\lambda_0$ is very small. Hence, the value $P^{dB-filtering}_{ASE}(\lambda_0)$ can almost be regarded as a constant.

However, in the measurement methods according to the first to fifth embodiments, the shape of gain spectrum is not described. To predict the characteristic as a gain spectrum, a number of wavelength filters must be prepared at a small wavelength interval. In addition, if the element structure, crystal composition, or the like has changed, and the gain peak wavelength largely deviates from the center wavelengths of prepared wavelength filters, the evaluation/screening accuracy degrades.

To solve these problems, the measurement method according to this embodiment includes a correction effect for such a wavelength deviation.

The gain $G^{dB}(\lambda_0)$ (dB expression) at the wavelength $\lambda$ in a range where the gain is large can be approximated to $$G^{dB}(\lambda) = G^{dB}_{peak} - 3\left(\frac{\lambda - \lambda_p}{\Delta \lambda}\right)^2 \quad (8)$$

where $G^{dB}_{peak}$ is the peak gain, $\lambda_p$ is the peak wavelength when the peak gain is obtained, and $\Delta \lambda$ is the half-width. When the three parameters $G^{dB}_{peak}$, $\lambda_p$, and $\Delta \lambda$ are specified, the gain spectrum can be defined. Hence, when the value $P^{dB}_{ASE-input}$ is obtained for each of three wavelengths, the gain spectra in a wide range can be obtained from equations (7) and (8).

Figure 9:
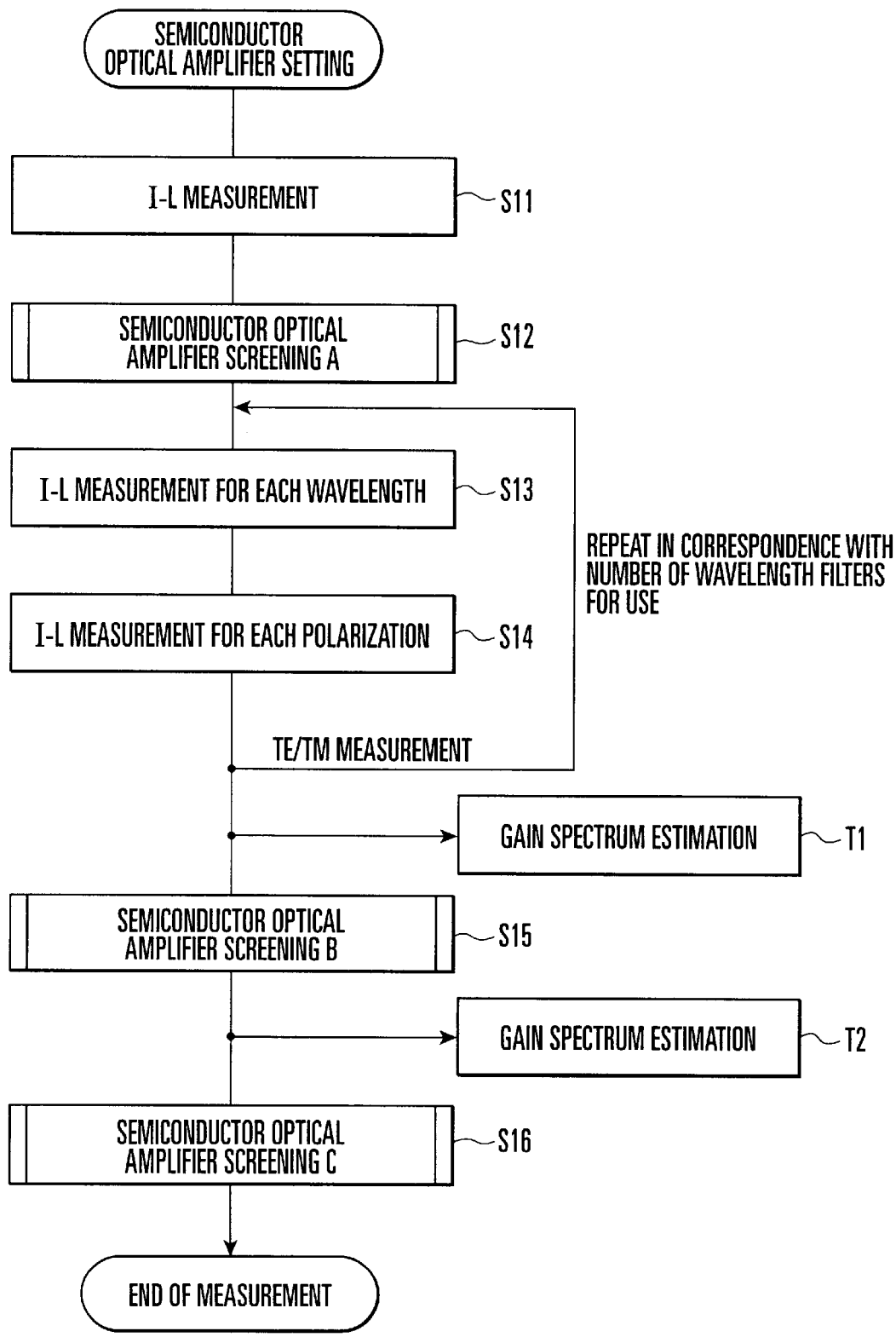
FIG. 9 is a flow chart of the characteristic evaluation screening method (SOA characteristic evaluation method) according to the sixth embodiment of the present invention.
Figure 10:
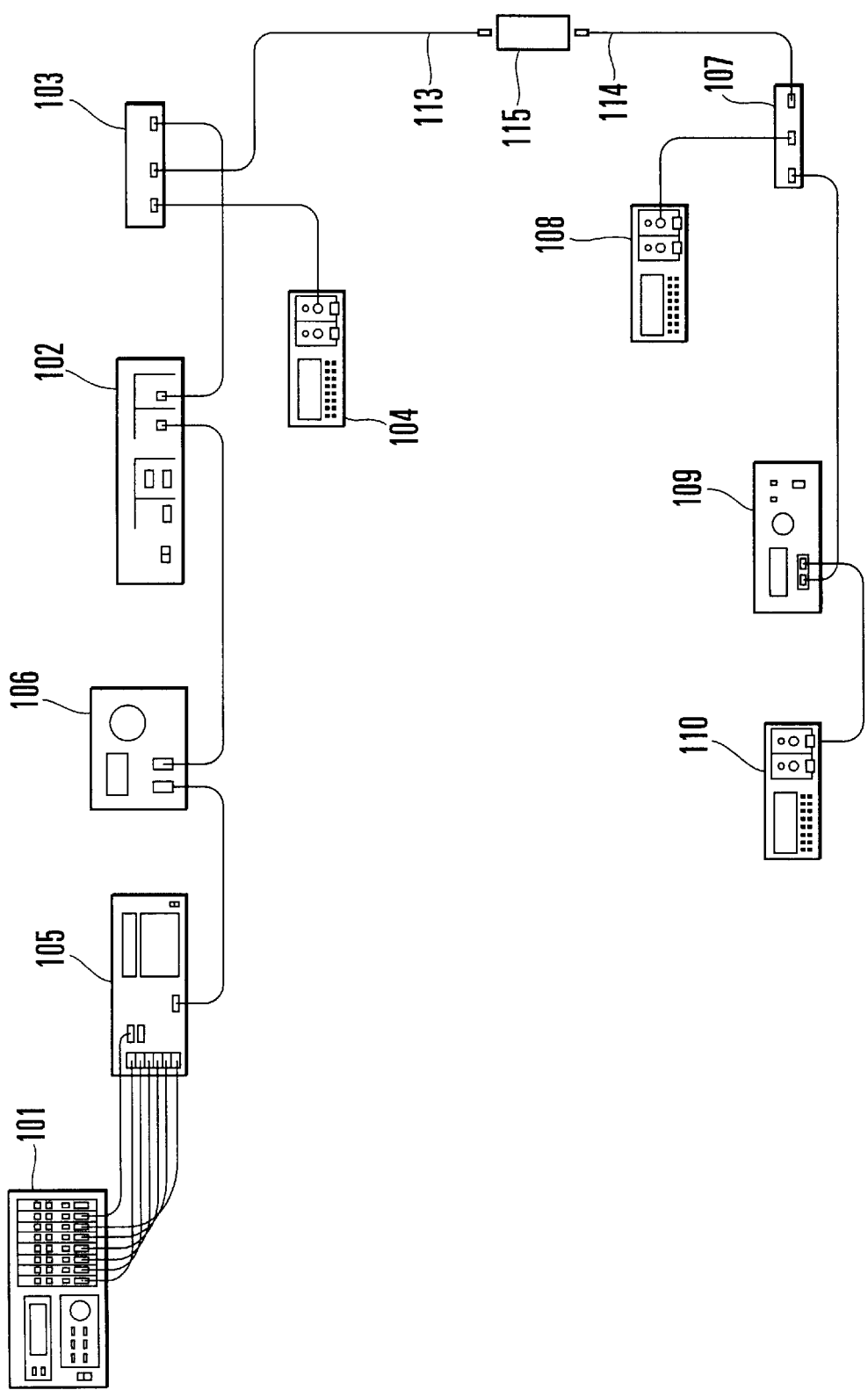
FIG. 10 is a view showing the schematic arrangement of a conventional SOA characteristic evaluation apparatus.

FIG. 9 is a flow chart of the characteristic evaluation screening method (SOA characteristic evaluation method) according to the sixth embodiment of the present invention. This will be described with reference to FIG. 6 AN SOAs 1 are set in the characteristic evaluation apparatus. The current is supplied from a probe 4. The optical output intensities from the end faces of an SOA 1 are detected by optical receivers 2 and 3. In this way, the current vs. optical output (I-L) characteristic is measured (step S11). The optical output intensity of the SOA 1 is compared with each specified value. Element screening A is thus executed (step S12).

Next, wavelength filters 5 and 6 are inserted between the end faces of the SOA 1 and optical receiver 2 and between the end faces of the SOA 1 and optical receiver 3, respectively. Subsequently, the current vs. optical output (I-L) characteristic of the SOA 1 is measured (step S13).

Then, polarizers 9 and 10 are inserted between the end faces of the SOA 1 and optical receiver 2 and between the end faces of the SOA 1 and optical receiver 3, respectively. Subsequently, the I-L characteristic of the SOA 1 for each polarization is measured (step S14). The measurement in step S14 is executed twice as the polarizers 9 and 10 pass TE mode transmission light and TM mode transmission light.

After the polarizers 9 and 10 are removed, the wavelength filters 5 and 6 are exchanged (for example, exchanged to wavelength filters 7 and 8 having a different transmission wavelength range), and measurement is executed. The measurement is repeated while appropriately exchanging the wavelength filters with those prepared for use. After that, the optical output intensity of the SOA 1 when the wavelength filters are inserted is compared with each specified value. Element screening B is thus executed (step S15).

Next, the optical output intensity of the SOA 1 when the polarizers 9 and 10 are inserted is compared with the specified value for each polarization. Element screening C is thus executed (step S16). For this measurement method, parameter fitting is executed on the basis of equations (7) and (8) using optical intensities measured for three or more wavelength filters. In this manner, the gain characteristic is estimated for each polarized wave component (step T1). In addition, as a characteristic feature, a step of estimating the gain characteristic for each polarized wave component (step T2) is added (wavelength characteristic estimation).

As the screening steps, the step S12 by the I-L characteristic, the step S15 by the I-L characteristic with wavelength filters, and the step S16 by the polarizers 9 and 10 are prepared. However, related evaluation and screening may be executed using only desired steps by appropriately selecting them. Evaluation and screening may also be executed using a desired one of steps T1 and T2 by appropriately selecting it. An external function for executing FFP measurement may be added. Note that, for example, steps S11 and S12 may be executed after steps S13 and S14 are repeated. The order of steps is not limited to that shown in FIG. 9.

In the description of this embodiment, the number of wavelength filters to be inserted or removed and the types and number of polarizers 9 and 10 are not particularly limited.

In this embodiment, at least three wavelength filters having different transmission wavelengths are used. Optical outputs from the SOA 1 when the wavelength filters are inserted or removed are measured for each wavelength filter. On the basis of the measurement results, the wavelength characteristic of the gain of the SOA 1 is estimated.

Accordingly, the wavelength characteristic of the gain of the SOA 1 can be grasped without executing measurement for a number of wavelengths. In addition, when the estimation result is used, the fact that the gain peak wavelength largely deviates from the expected center wavelength can be specified to some extent. Hence, even when defects are generated, the reason for the degradation caused in evaluation/screening results may be clarified.

Furthermore, in this embodiment, at least three wavelength filters having different transmission wavelengths are used. For each wavelength filters, optical outputs from the SOA 1 are measured while keeping the wavelength filters inserted and the polarizers 9 and 10 inserted or removed. On the basis of the measurement result, the wavelength characteristic of the gain of the SOA 1 is estimated for each polarized optical component.

Hence, the wavelength characteristic of the gain of the SOA 1 for each polarized optical component can be grasped without executing measurement for a number of wavelengths. In addition, when the estimation result is used, the cause that the gain peak wavelength largely deviates from the center wavelength of a wavelength filter can be specified to some extent. Hence, even when defects are generated, the reason for the degradation caused in evaluation/screening results may be clarified.

In all the above-described embodiments, current supply to the SOA 1 may be done either by pulse driving or by CW driving.

As has been described above, in the present invention, an optical output generated by an SOA is measured by an optical receiver, and the characteristic of the SOA is evaluated on the basis of the measurement result. Accordingly, the characteristic screening of SOAs can be executed without making external light incident on the SOAs. For example, it can be discriminated on the basis of the optical output intensity from an SOA while keeping wavelength filters inserted or removed whether the gain and gain spectrum of the SOA at a specific wavelength are appropriate. Hence, for example, even when pulse driving is executed, a sufficient measurement sensitivity can be ensured.

As a result, according to the present invention, in evaluating an SOA, no fiber coupling to the two ends of the SOA is needed to eliminate the fiber coupling loss. In addition, the evaluation chip can be directly used for a product.

What is claimed is:

1. A semiconductor optical amplifier characteristic evaluation method comprising the steps of:

supplying the current to a semiconductor optical amplifier;

measuring an optical output generated by the semiconductor optical amplifier that has received the current;

measuring transmission light obtained by transmitting the optical output through optical transmission adjustment means; and evaluating a characteristic of the semiconductor optical amplifier on the basis of a measurement result of the optical output and a measurement result of the transmission light without using an optical input to the semiconductor optical amplifier.

2. A method according to claim 1, wherein a plurality of semiconductor optical amplifiers are arrayed, the current is supplied to the semiconductor optical amplifiers while sequentially bringing a probe into contact with the arrayed semiconductor optical amplifiers, and an optical output generated by each of the semiconductor optical amplifiers that have received the current is measured.

3. A method according to claim 1, wherein the measurement result of the optical output and the measurement result of the transmission light are compared with corresponding specified values, and the evaluation is done on the basis of reference results.

4. A method according to claim 3, wherein the optical transmission adjustment means comprises a wavelength filter.

5. A method according to claim 3, wherein the optical transmission adjustment means comprises a wavelength filter, and in measuring the transmission light obtained by transmitting the optical output through the optical transmission adjustment means, transmission optical components are extracted and measured while changing a center wavelength of a transmission wavelength band, measurement results of the transmission optical components are compared with corresponding specified values, and the evaluation is done on the basis of reference results.

6. A method according to claim 3, wherein the optical transmission adjustment means comprises a polarizer.

7. A method according to claim 3, wherein the optical transmission adjustment means comprises a polarizer, and in measuring the transmission light obtained by transmitting the optical output through the optical transmission adjustment means, two transmission optical components which are obtained through the polarizer and whose polarization states are perpendicular to each other are measured, measurement results of the two transmission optical components whose polarization states are perpendicular to each other are compared with corresponding specified values, and the evaluation is done on the basis of reference results.

8. A method according to claim 3, wherein the optical transmission adjustment means comprises a wavelength filter and polarizer, transmission light obtained by transmitting the optical output through the wavelength filter and the polarizer is measured, a measurement result of the transmission light is compared with a corresponding specified value, and the evaluation is done on the basis of a reference result.

9. A method according to claim 3, wherein the optical transmission adjustment means comprises a wavelength filter and polarizer, transmission light obtained by transmitting the optical output through the wavelength filter is measured, a measurement result of the transmission light is compared with a corresponding specified value, transmission light obtained by transmitting the optical output through the wavelength filter and the polarizer is newly measured, a measurement result of the transmission light is compared with a corresponding specified value, and the evaluation is done on the basis of reference results.

10. A method according to claim 3, wherein the optical transmission adjustment means comprises a wavelength filter and a polarizer, in a state wherein transmission optical components are extracted while changing a center wavelength of a transmission wavelength band by the wavelength filter, transmission optical components obtained by transmitting the optical output through the wavelength filter and the polarizer are measured, measurement results of the transmission optical components are compared with specified values, and the evaluation is done on the basis of reference results.

11. A method according to claim 3, wherein the optical transmission adjustment means comprises a wavelength filter and a polarizer, and in measuring the transmission light obtained by transmitting the optical output through the optical transmission adjustment means, transmission optical components are extracted and measured while changing a center wavelength of a transmission wavelength band, measurement results of the transmission optical components are compared with corresponding specified values, newly in a state wherein transmission optical components are extracted while changing a center wavelength of a transmission wavelength band by the wavelength filter, transmission optical components obtained by transmitting the optical output through the wavelength filter and the polarizer are measured, measurement results of the transmission optical components are compared with specified values, and the evaluation is done on the basis of reference results.

12. A method according to claim 3, wherein at least three transmission optical components in wavelength bands having different center wavelengths are newly extracted and measured by transmitting the optical output through a wavelength filter, and a wavelength characteristic of a gain of the semiconductor optical amplifier is estimated on the basis of measurement results of the transmission optical components.

13. A method according to claim 3, wherein at least three transmission optical components in wavelength bands having different center wavelengths are newly extracted and measured by transmitting the optical output through a wavelength filter, transmission optical components obtained by transmitting the transmission optical components through a polarizer are measured, and a wavelength characteristic of a gain of the semiconductor optical amplifier is estimated on the basis of measurement results of the transmission optical components and measurement results of the transmission optical components.

14. A semiconductor optical amplifier characteristic evaluation apparatus comprising:

current supply means for supplying the current to a semiconductor optical amplifier;

optical receiving means for receiving an optical output emerging from the semiconductor optical amplifier in accordance with the current supplied by said current supply means;

optical transmission adjustment means arranged in an optical path between the semiconductor optical amplifier and said optical receiving means so as to be inserted or removed; and evaluation means for evaluating a characteristic of the semiconductor optical amplifier on the basis of an output from said optical receiving means without using an optical input to the semiconductor optical amplifier.

15. An apparatus according to claim 14, wherein said apparatus further comprises fixing means, movable in a predetermined position, for arraying and fixing a plurality of semiconductor optical amplifiers, said current supply means comprises a probe and probe movement control means for bringing said probe into contact with the semiconductor optical amplifier, and said optical receiving means receives an optical output emerging from the semiconductor optical amplifier which is in contact with said probe and is receiving the current.

16. An apparatus according to claim 14, wherein said evaluation means collates an output from said optical receiving means which has received the optical output and an output from said optical receiving means which has received transmission light obtained by transmitting the optical output through said optical transmission adjustment means with corresponding specified values and executes the evaluation on the basis of reference results.

17. An apparatus according to claim 16, wherein said optical transmission adjustment means comprises a wavelength filter.

18. An apparatus according to claim 16, wherein said optical transmission adjustment means comprises a wavelength filter having means for changing a center wavelength of a transmission wavelength band, and said evaluation means collates outputs from said optical receiving means which has received transmission optical components extracted while changing by said wavelength filter a center wavelength of a transmission wavelength band with corresponding specified values and executes the evaluation using reference results.

19. An apparatus according to claim 16, wherein said optical transmission adjustment means comprises a polarizer.

20. An apparatus according to claim 16, wherein said optical transmission adjustment means comprises a polarizer, and said evaluation means collates outputs from said optical receiving means which has received two transmission optical components which are obtained through said polarizer and whose polarization states are perpendicular to each other with corresponding specified values, and executes the evaluation using reference results.

21. An apparatus according to claim 16, wherein said optical transmission adjustment means comprises a wavelength filter and a polarizer, and said evaluation means collates an output from said optical receiving means which has received the optical output and an output from said optical receiving means which has received transmission light obtained through said wavelength filter and said polarizer with corresponding specified values, and executes the evaluation using reference results.

22. An apparatus according to claim 16, wherein said optical transmission adjustment means comprises a polarizer and a wavelength filter having means for changing a center wavelength of a transmission wavelength band, and said evaluation means collates outputs from said optical receiving means which has received transmission optical components which emerge from the semiconductor optical amplifier and are transmitted through said wavelength filter and said polarizer in a state wherein transmission optical components are extracted while changing by said wavelength filter the center wavelength of the transmission wavelength band with corresponding specified values, and executes the evaluation using reference results.

23. An apparatus according to claim 16, further comprising at least three wavelength filters which pass wavelength bands with different center wavelengths, and wavelength characteristic estimation means for estimating a wavelength characteristic of a gain of the semiconductor optical amplifier on the basis of outputs from said optical receiving means which has received transmission optical components transmitted through said wavelength filters.

24. An apparatus according to claim 16, further comprising a polarizer, at least three wavelength filters which pass wavelength bands with different center wavelengths, and wavelength characteristic estimation means for estimating a wavelength characteristic of a gain of the semiconductor optical amplifier on the basis of outputs from said optical receiving means which has received transmission optical components transmitted through said wavelength filters and outputs from said optical receiving means which has received transmission optical components transmitted through said wavelength filters and said polarizer.

* * * * *